United States Patent [19]

Berecz

[11] 4,119,130

[45] Oct. 10, 1978

[54] BARREL NUT AND METHOD OF MANUFACTURE

[75] Inventor: Imre Berecz, Dana Point, Calif.

[73] Assignee: Microdot Inc., Greenwich, Conn.

[21] Appl. No.: 772,128

[22] Filed: Feb. 25, 1977

[51] Int. Cl.² .................................... F16B 39/00
[52] U.S. Cl. ............................ 151/41.76; 10/86 R
[58] Field of Search .............. 151/41.76, 41.74, 41.72, 151/37, 41.7; 85/32 R, 32 K; 10/86 R, 86 A, 155 R

[56] References Cited

U.S. PATENT DOCUMENTS

| 2,448,902 | 9/1948 | McKenzie | 151/41.76 X |
|---|---|---|---|
| 2,455,145 | 11/1948 | Swanstrom | 151/41.76 |
| 2,658,546 | 11/1953 | Crowther | 151/41.76 |
| 3,177,916 | 4/1965 | Rosan | 151/41.73 |
| 3,205,927 | 9/1965 | Phelan | 151/41.76 |
| 3,208,496 | 9/1965 | Phelan | 151/41.76 |
| 3,322,177 | 5/1967 | Phelan | 151/41.76 |

*Primary Examiner*—Ramon S. Britts
*Attorney, Agent, or Firm*—Harness, Dickey & Pierce

[57] ABSTRACT

A barrel nut particularly adapted for high strength applications, and method of manufacture which results in a great cost reduction as compared with the prior art. The barrel nut comprises a semi-cylindrical barrel element having a recess for the nut element, the recess having side as well as end walls. The side walls are pierced and the nut element has ears extending into these openings for retention purposes. The method of manufacture comprises forming a cylindrical slug, forming the slug into the recessed barrel shape, drilling the bolt opening, piercing the side walls of the recess, placing the nut element in the recess, and crimping the side walls inwardly to retain the nut element ears.

1 Claim, 8 Drawing Figures

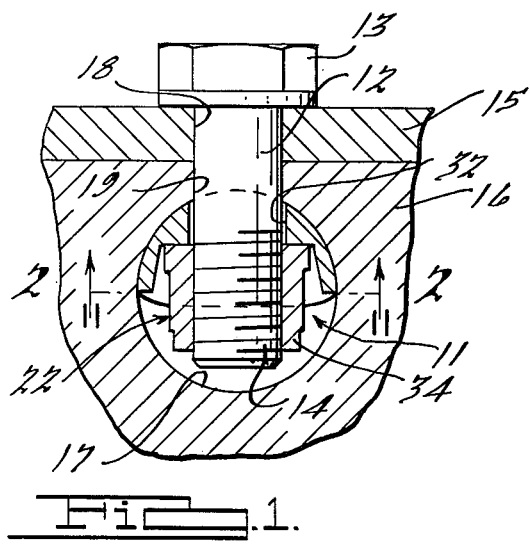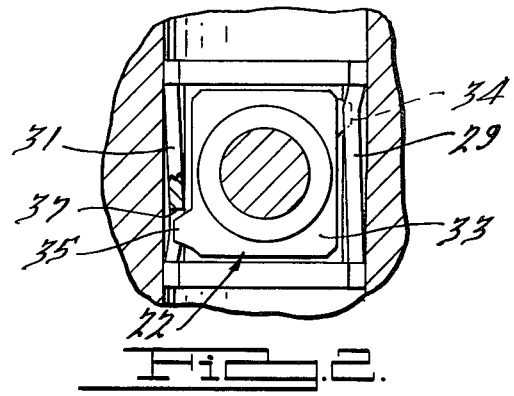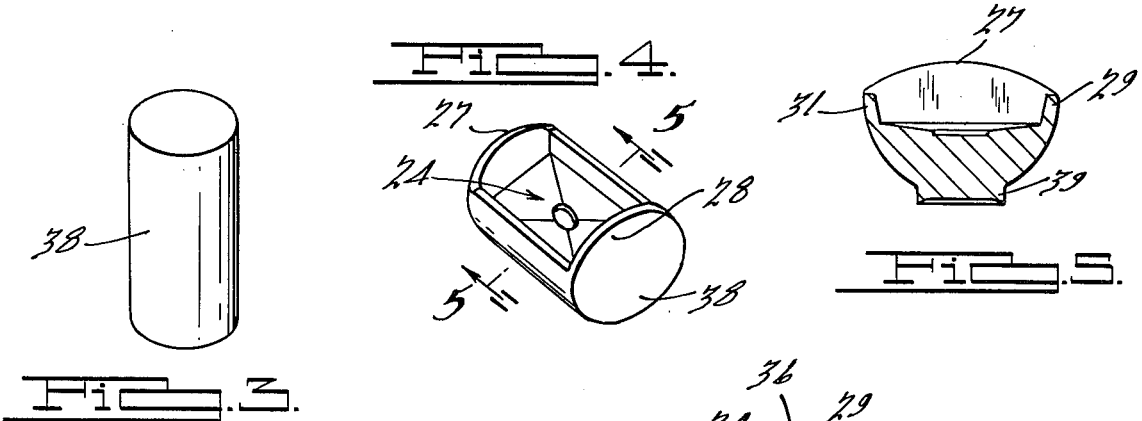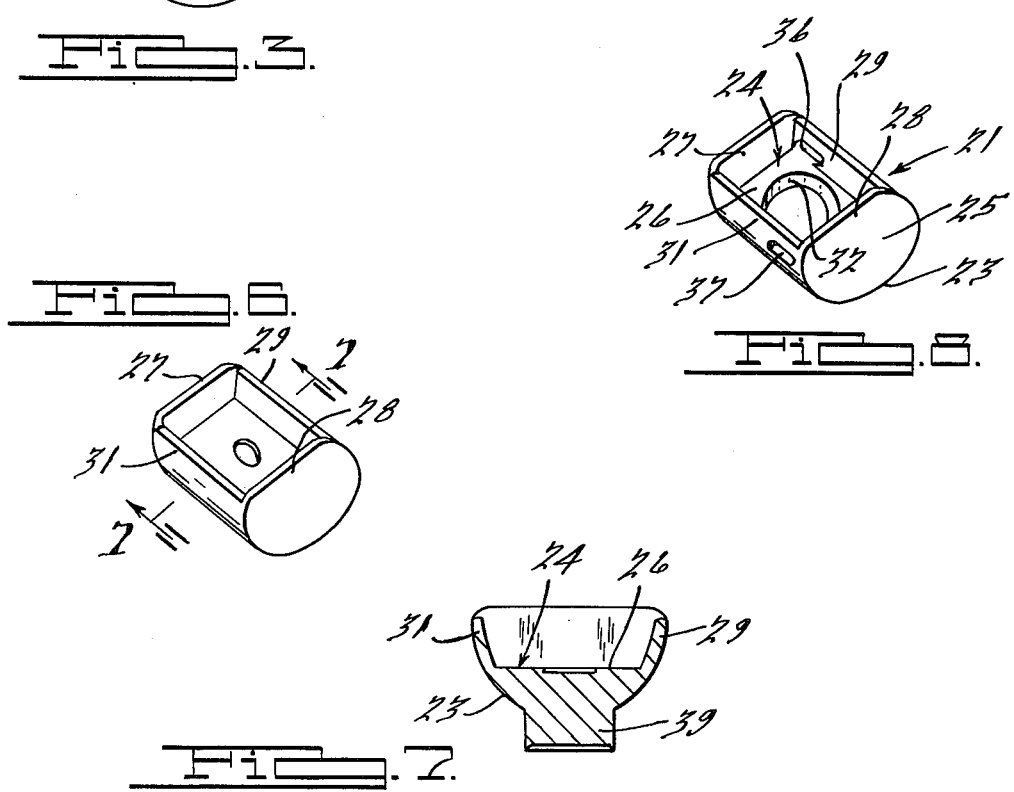

BARREL NUT AND METHOD OF MANUFACTURE

BACKGROUND OF THE INVENTION

1. Field of the Invention

The invention relates to barrel nuts and more particularly to nuts of this type which are especially adapted for high strength applications such as aircraft. Nuts of this type generally have a semi-cylindrical barrel element which loosely retains a nut element. The bolt passes through an opening in the barrel element and is threaded into the nut element.

2. Description of the Prior Art

Presently, the barrel element is manufactured from bar stock which is machined by forming a recess having end walls but no side walls, and drilling the bolt hole which extends between the flat bottom surface of the recess and the outer convex surface of the barrel. The nut element is then placed in the recess and held in position by two pins which are inserted in drilled holes in the opposite end walls.

This prior construction involves a considerable amount of machining which is both time-consuming and expensive. Furthermore, since the barrel recess is devoid of side walls, the barrel element has limited strength because the end walls are unsupported at their opposite ends.

BRIEF SUMMARY OF THE INVENTION

It is an object of the present invention to provide a novel and improved method of construction for barrel nuts which overcomes some of the disadvantages and shortcomings of the prior barrel nut described above, and greatly reduces the cost of manufacture.

It is another object to provide an improved barrel nut of this nature and method of manufacture which provides increased strength for the barrel element.

Briefly, the invention comprises a barrel nut having a barrel element and a nut element, said barrel element being a semi-cylindrical member having a convex side and a recessed side, the recessed side having a recess with a bottom, side walls and end walls, a bolt receiving hole extending from the convex surface of said barrel element to said recess bottom, said nut element being disposed in said recess, a pair of ears extending from opposite side edges of said nut element, and apertured portions in said recess side walls receiving said ears.

As a method of manufacture, the invention comprises the steps of forming a cylindrical slug of metal, forming said slug into a semi-cylindrical barrel having a convex side and a recessed side, the recess having side walls and end walls to form a rectangular recess, said recess having a flat bottom, drilling a bolt receiving aperture between said recess bottom and the convex surface of said barrel element, forming ear-receiving apertures in the opposite side walls of said recess, forming a nut element having a rectangular base and a tubular threaded portion extending upwardly therefrom, forming ears on the opposite side edges of said nut element base, placing said nut element base in said barrel element recess so that said ears are aligned with said recess side wall apertures, and forcing said recess side walls toward said nut element base so that said ears at least partially enter said apertures.

BRIEF DESCRIPTION OF THE DRAWINGS

FIG. 1 is a cross sectional view in elevation showing the barrel nut of this invention combined with a bolt and holding two parts together;

FIG. 2 is a fragmentary cross sectional view taken along the line 2—2 of FIG. 1;

FIG. 3 is a perspective view of the slug used to initiate manufacture of the barrel element;

FIG. 4 is a perspective view of the slug in its partially formed position;

FIG. 5 is a cross sectional view taken along the line 5—5 of FIG. 4;

FIG. 6 is a perspective view of the slug after the second stage of its formation into the barrel element;

FIG. 7 is a cross sectional view taken along the line 7—7 of FIG. 6; and

FIG. 8 is a perspective view showing the final stage of formation of the barrel element.

DESCRIPTION OF THE PREFERRED EMBODIMENT

The barrel nut is generally indicated at 11 and is used in conjunction with a bolt 12 having a head 13 and a threaded portion 14. The bolt and barrel nut hold two parts of 15 and 16 together, part 16 having a circular aperture 17 into which barrel nut 11 is inserted, bolt 12 thereafter being passed through aligned apertures 18 and 19 in parts 15 and 16 respectively and threaded into nut 11.

Barrel nut 11 comprises two elements, a barrel element generally indicated at 21 in FIG. 8 and a nut element generally indicated at 22 in FIGS. 1 and 2. Barrel element 21 in its final form is of semi-cylindrical shape, having a convex surface 23 and a recess generally indicated at 24 at its opposite end. The barrel element has flat end walls 25, and recess 24 has a flat bottom 26, end walls 27 and 28 and side walls 29 and 31. A hole 32 is formed which extends from convex surface 23 to bottom 26 of recess 24. This hole is large enough to accommodate the shank of bolt 12.

Nut element 22 has a rectangular base 33 and a tubular internally threaded extension 34. Base 33 fits loosely within walls 27, 28, 29 and 31 of recess 24. The opposite side edges of base 33 have ears 34 and 35 extending outwardly therefrom, and these ears are disposed within apertured portions 36 and 37 of recess side walls 29 and 31 respectively. The dimensions of these parts are such that, while nut element 22 is permitted limited sideward and endward movement, it cannot be removed from recess 24.

As seen in FIG. 2, the side walls 29 and 31 are pressed inwardly in the vicinity of ears 34 and 35 to retain the nut element in place, ears 34 and 35 being diagonally opposite each other. It should be noted that while in use there will be no appreciable stress imposed on ears 34 or 35 or their adjoining parts of the barrel element, the forces instead being transmitted directly from base 33 of the nut element to bottom 26 of the barrel element recess.

In carrying out the method of manufacture of this invention, a cylindrical metal slug 38 will first be formed. This slug will then be formed in a closed die in multiple stages, the first stage being shown in FIGS. 4 and 5. In this stage, slug 38 has been partially flattened and a recess 24 partially formed therein although the end walls 27 and 28 of the recess still have rounded upper edges. Side walls 29 and 31 are also partially formed in this first operation, and some material 39 has been forced downwardly, being displaced by the recess which has been partially formed.

The second forming stage is shown in FIGS. 6 and 7 and again would be accomplished with closed dies. In this stage end walls 27 and 28 have been formed with flattened top edges and side walls 29 and 31 are deeper, reflecting the increased depth of recess 24. The amount of displaced material 39 is now greater than in the first stage.

As the next stage in manufacture, the hole 32 is drilled between bottom 26 of the recess and the convex surface 23 of the barrel element. This is shown in FIG. 8 and which also shows lanced openings 36 and 37 formed in side walls 29 and 31 respectively.

Nut element 22 is manufactured by conventional metal forming methods to achieve the finished shape shown in FIGS. 1 and 2. The base 33 of nut element 22 is then placed in recess 24 so that its ears 34 and 35 are aligned with apertures 36 and 37 respectively. Walls 29 and 31 are then pressed inwardly as shown in FIG. 2 to cause ears 34 and 35 to enter apertures 36 and 37. The dimensions are such that nut 22 is still allowed limited sideward and endward movement.

While it will be apparent that the invention herein disclosed is well calculated to achieve the benefits and advantages as hereinabove set forth, it will be appreciated that the invention is susceptible to modification, variation and change without departing from the spirit thereof.

I claim:

1. A barrel nut comprising a barrel element and a nut element, said barrel element comprising an elongated member semi-cylindrical in transverse cross section and having a convex side and a concave recessed side, the recessed side being of a rectangular configuration and having a flat bottom with integral longitudinal side walls and transverse imperforate end walls, a bolt receiving hole extending from the convex surface of said barrel element to said recess bottom, said nut element having a rectangular portion disposed in said recess, a pair of ears extending from opposite side edges of the rectangular portion of said nut element, apertures in the side walls of said barrel element for receiving the ears on said nut element, said apertures being larger than said ears to provide for rotational movement of said ears, said side walls being deflected radially inwardly so as to overlie said ears, said ears being diametrically opposite each other and the average distance from said end walls of said recess to said rectangular portion being no greater than the average distance from the side walls to the rectangular portion and less than the distance of rotational movement permitted said ears in said apertures whereby said ends walls preclude relative rotation between said barrel element and said nut element.

* * * * *